United States Patent
Kraft

(10) Patent No.: US 6,655,952 B1
(45) Date of Patent: Dec. 2, 2003

(54) 3-AXIS UNDERCUT RELEASE APPARATUS AND METHOD

(75) Inventor: Joseph D. Kraft, Waukesha, WI (US)

(73) Assignee: Tooling Technologies, Inc., Franklin, WI (US)

( * ) Notice: Subject to any disclaimer, the term of this patent is extended or adjusted under 35 U.S.C. 154(b) by 0 days.

(21) Appl. No.: 09/682,797

(22) Filed: Oct. 19, 2001

(51) Int. Cl.⁷ ............................................. B29C 45/44
(52) U.S. Cl. .................. 425/556; 264/318; 425/438; 425/444; 425/DIG. 58
(58) Field of Search ................................. 425/438, 441, 425/443, 444, 554, 556, DIG. 58; 264/318

(56) References Cited

U.S. PATENT DOCUMENTS

| | | | |
|---|---|---|---|
| 3,049,759 A | 8/1962 | Eberhardt | 18/42 |
| 3,642,417 A | 2/1972 | Von Holdt | 425/443 |
| 4,123,495 A | 10/1978 | Abey | 264/318 |
| 5,114,657 A * | 5/1992 | Miyajima | 264/334 |
| 5,137,442 A | 8/1992 | Starkey | 425/438 |
| 5,281,127 A | 1/1994 | Ramsey | 425/556 |
| 5,316,467 A * | 5/1994 | Starkey | 425/438 |
| 5,551,864 A * | 9/1996 | Boskovic | 425/556 |
| 5,630,977 A * | 5/1997 | Catalanotti et al. | 264/318 |
| 5,773,048 A | 6/1998 | Ramsey | 425/556 |
| 5,814,357 A | 9/1998 | Boskovic | 425/556 |
| 6,457,968 B1 * | 10/2002 | Navarra Pruna | 425/556 |
| 6,491,513 B1 * | 12/2002 | Schneider | 425/577 |
| 2002/0121725 A1 * | 9/2002 | Sobolewski | 264/163 |

* cited by examiner

Primary Examiner—W. L. Walker
Assistant Examiner—Emmanuel Luk
(74) Attorney, Agent, or Firm—Whyte Hirschboeck Dudek SC

(57) ABSTRACT

An undercut release component having an end configured for molding a part having an undercut is disclosed wherein the configured end disengages from the molded undercut by traveling in a 3-axis path. A process for providing undercut release in a mold is also disclosed.

12 Claims, 8 Drawing Sheets

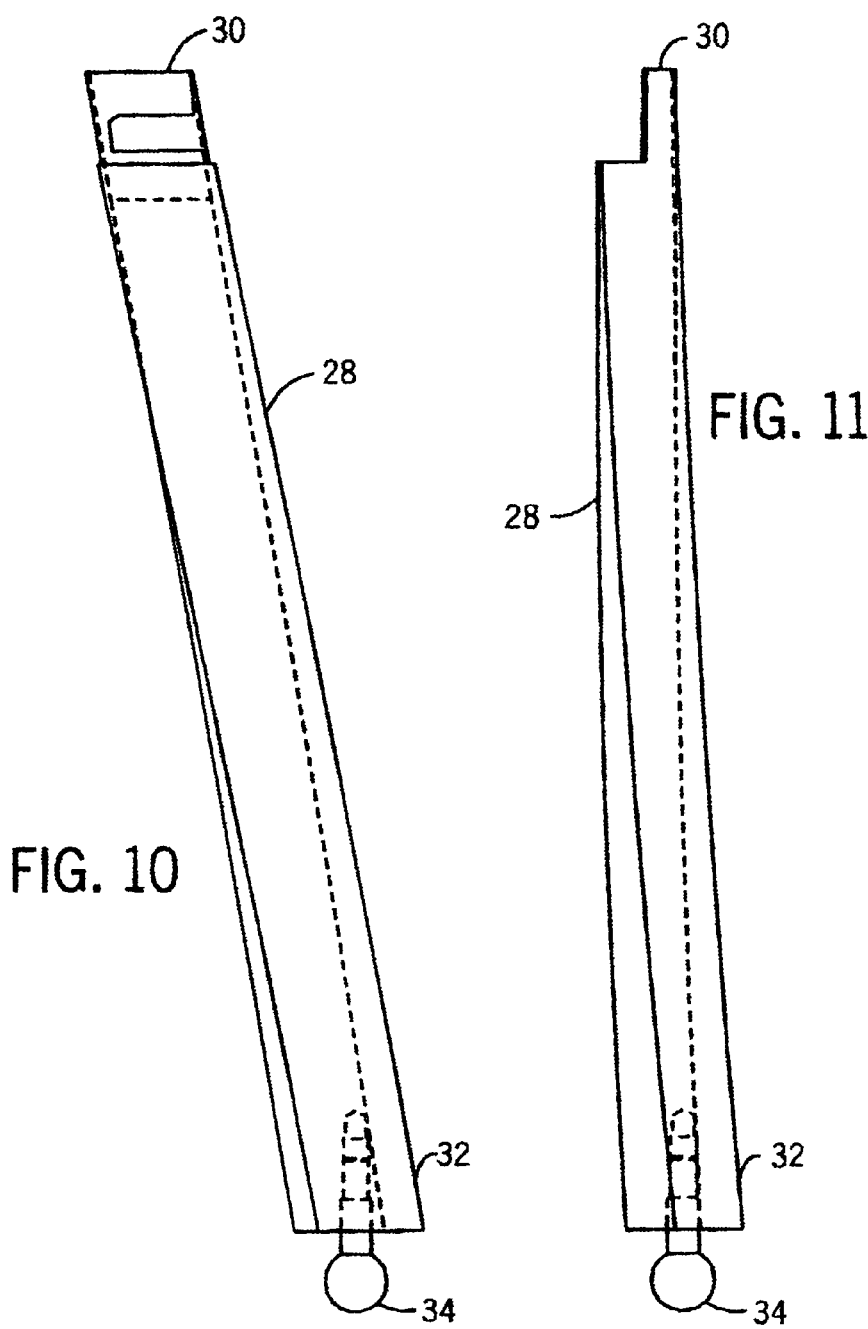

3-AXIS UNDERCUT RELEASE APPARATUS AND METHOD

BACKGROUND OF INVENTION

The present invention is directed to the field of mold design. More particularly, the present invention is directed for providing undercut release for molding parts having undercuts. Internal core lifters are used within a mold device to mold and eject undercuts in injection molds. An internal core lifter generally consists of a core blade seated at a predetermined angle achieved by mounting one end of the core blade at a fixed angle to a coupling which then slides linearly along a support mounted to the mold ejection plates.

In order to mold undercuts and eject the parts, the core lifter has a core blade that is attached to one ejector system of the mold, and the opposite end of the core blade is used to mold and eject the part. To mold undercuts, the core blade is placed at an angle determined by the mold design. Since one end of the core blade is configured to mold the undercut of the plastic part, the core blade is required to move horizontally away from the undercut during a vertical ejection of the part. This horizontal movement is necessary during ejection so as not to damage the part.

In a typical prior art undercut release system, an ejector blade is engaged with the mold. The ejector blade travels through a slide or slot in the mold. One end of the ejector is configured to provide the undercut of the molded part when the ejector blade is aligned with the internal mold cavity of the mold. The opposite end of the ejector blade is attached via a coupling to an ejector plate. The coupling is designed to transmit pushing and pulling forces to the ejector blade. The coupling is also designed to allow the ejector blade to travel in a linear direction to provide clearance for the formed undercut of the part. The movement of the ejector blade forward provides clearance from the undercut and the movement of the ejector blade upward helps eject the part from the mold cavity. A representative example of such a prior art undercut release system is disclosed in U.S. Pat. No. 5,137,442.

Previous undercut release apparatuses have relied on planar motion of the core lifters to provide release from the molded undercut. However, due to the part configuration, it may be desirable or necessary for the release mechanism to travel off plane in order to avoid damaging the molded part. Such off plane, or three-axis, movement is a hallmark of the present invention.

SUMMARY OF INVENTION

In one embodiment, the invention comprises an apparatus for molding parts having at least one undercut, the apparatus comprising: (i) an undercut release component having a body with a first end configured for molding a part having an undercut wherein the undercut release component is capable of movement whereby the first end moves away from the undercut in a 3-axis path.

In another embodiment, the invention comprises an undercut release component comprising: (i) a body having a first end configured for molding a part having an undercut and an opposite second end adapted for transmitting and receiving both pushing and pulling forces, wherein the undercut release component is slideably engaged with an injection. mold assembly; and, (ii) a coupling engaged with the second end for transmitting pushing and pulling forces to the second end and allowing nonlinear movement of the second end, wherein the undercut release component is capable of movement whereby the first end moves away from the undercut in a 3-axis path.

In-another embodiment, the invention comprises a process for providing undercut release in a mold, the process comprising the steps of: (i) providing an undercut release component having a first end, the first end configured for molding a part having an undercut, the undercut release component being movably engaged with the mold; and (ii) moving the undercut release component alternately between a first position wherein the first end aligns with the mold to form a continuous molding surface and a second position wherein the first end is disposed away from the undercut, wherein the first end traces a 3-axis. path when moving between the first position and the second position.

BRIEF DESCRIPTION OF DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts.

FIG. 10 is a front view of an undercut release component.

FIG. 11 is a side view of the undercut release component of FIG. 10.

FIG. 12 is a top view of the undercut release component of FIG. 10.

DETAILED DESCRIPTION

In the following detailed description, references made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention.

In one preferred embodiment, the present invention comprises an undercut release system comprising an undercut release component engaged with a mold. One end of the undercut release component is configured to form the undercut of the molded part. The opposite end of the undercut release component is adapted to receive and transmit pushing and pulling forces from the ejector plate. The body of the undercut release component comprises a twist. The twist represents a segment of a helix. The helix is defined by its mathematical terms, i.e., a three-dimensional curve that lies on a cylinder or cone, such that the curve's angle to a plane perpendicular to the cylinder or cone axis is constant. Typically, the radius of the cylindrical helix is the same as the radial distance of the undercut release component within the mold cavity. The angle of the twist curve, or helix, is determined by the desired angle of traverse for the undercut release compound through the mold assembly. The slot or channel within the mold assembly which receives the undercut release component is also configured with a helical shape corresponding to the helical shape of the undercut release component in the mold. Movement of the ejector plate towards and away from the mold causes the undercut release component to move back and forth within the mold slot. This back and forth movement causes the configured end of the undercut release component to move upward, forward and along a helical path. Such movement is known herein as 3-axis or non-planar movement. This 3-axis movement of the undercut release component provides clearance from the undercut and aids in ejecting the part from the mold cavity. The 3-axis motion allows the undercut release component to clear portions of the molded part lying inline with the molded undercut. The coupled end of the undercut release component also travels a corresponding three-axis path. As such, the coupling means must accommodate nonlinear movement within the coupling. Such nonlinear coupling may be accomplished by providing a pivot ball mounted to the coupling end of the undercut release component. The pivot ball is received and contained within an arcuate channel within the ejector plate. The arcuate channel allows the pivot ball to move forward and back along the curved channel in a nonlinear direction.

The invention is illustrated in the following preferred embodiment.

Figure 1:
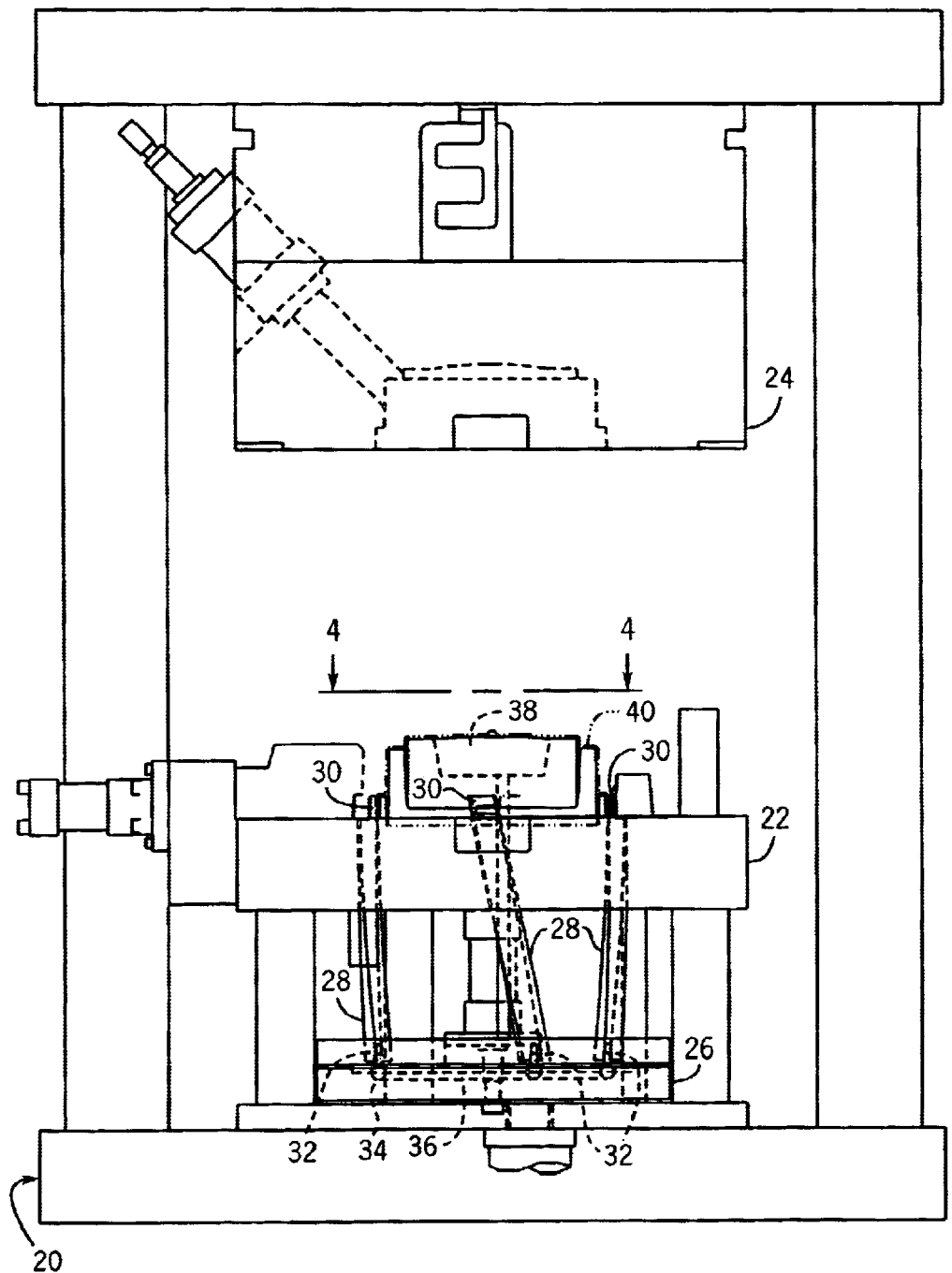
FIG. 1 is a side view of a mold apparatus incorporating the present invention.

FIG. 1 shows a mold apparatus 20 comprising an embodiment of the present invention. The mold apparatus 20 comprises lower mold plate assembly 22, upper mold plate assembly 24 and first ejector plate 26. Upper mold plate assembly 24 is shown in the open position. First ejector plate 26 is shown in the closed or engaged position. Undercut release component 28 is slideably engaged with lower mold plate assembly 22 and is coupled with first ejector plate 26. Undercut release component 28 has a first configured end 30 which is adapted to engage with the mold assemblies to form the undercut in a molded part. Undercut release component 28 has a second coupled end 32 which engages with first ejector plate 26. In a preferred embodiment of the coupling, coupling pivot ball 34 attached to coupled end 32 is contained within coupling channel 36 of first ejector plate 26. Preferably, the mold apparatus 20 also comprises an ejector 38 coupled to second ejector plate 44. Ejector 38 aids in the removal of molded part 40 from the mold apparatus 20.

Figure 2:
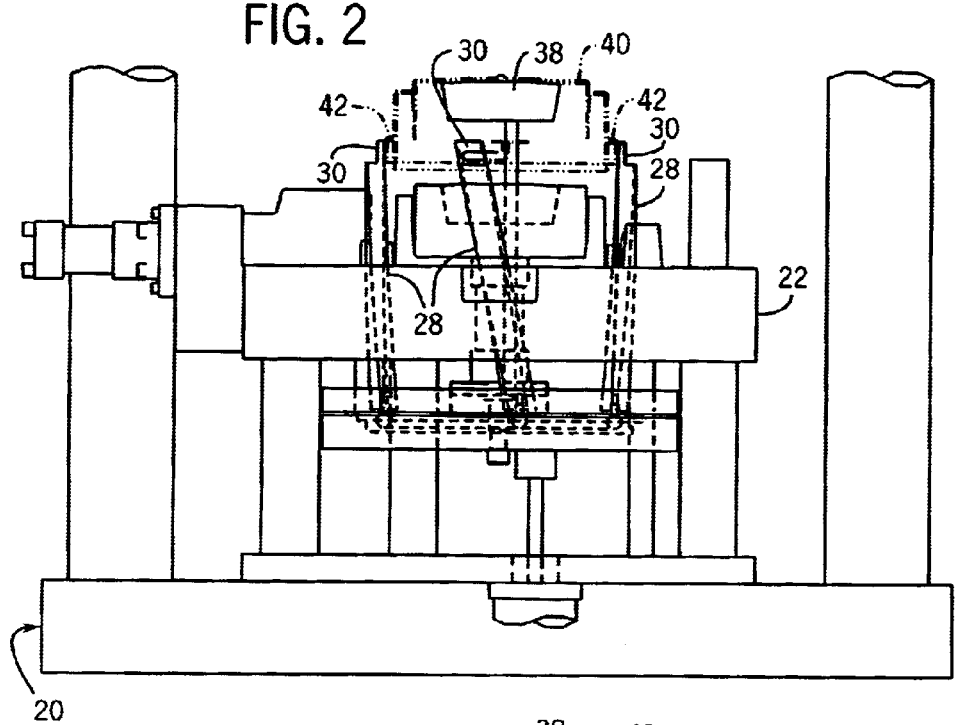
FIG. 2 is a side view of the mold apparatus of FIG. 1 with the undercut release components in an open position.

FIG. 2 shows mold apparatus 20 at an intermediate stage of ejection of molded part 40. First ejector plate 26 and second ejector plate 44 have advanced towards lower mold plate assembly 22. As a result of the advancement of first ejector plate 26 and second ejector plate 44, undercut release components 28 and ejector 38 have moved molded part 40 away from the mold cavity on lower mold plate assembly 22. Additionally, the movement of undercut release component 28 has disengaged configured end 30 from the molded undercut 42 on molded part 40. In disengaging from the molded undercut 42, configured end 30 travels in a 3-axis path as described in detail below.

Figure 3:
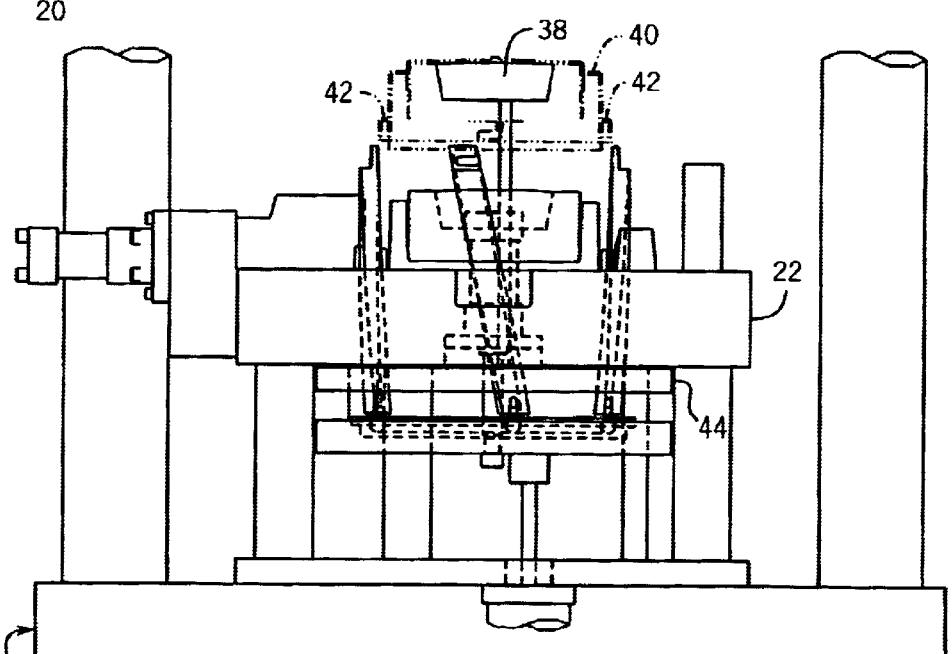
FIG. 3 is a side view of the mold apparatus of FIG. 2 with the molded part fully disengaged from the undercut release components.

FIG. 3 shows mold apparatus 20 at the end of the ejection cycle. Second ejector plate 44 has advanced further towards lower mold plate assembly 22 then as shown in FIG. 2. The further advancement of second ejector plate 44 provides for further movement of ejector 38 thereby providing complete disengagement of molded part 40 from the mold on lower mold plate assembly 22 and from undercut release components 28.

Figure 4:
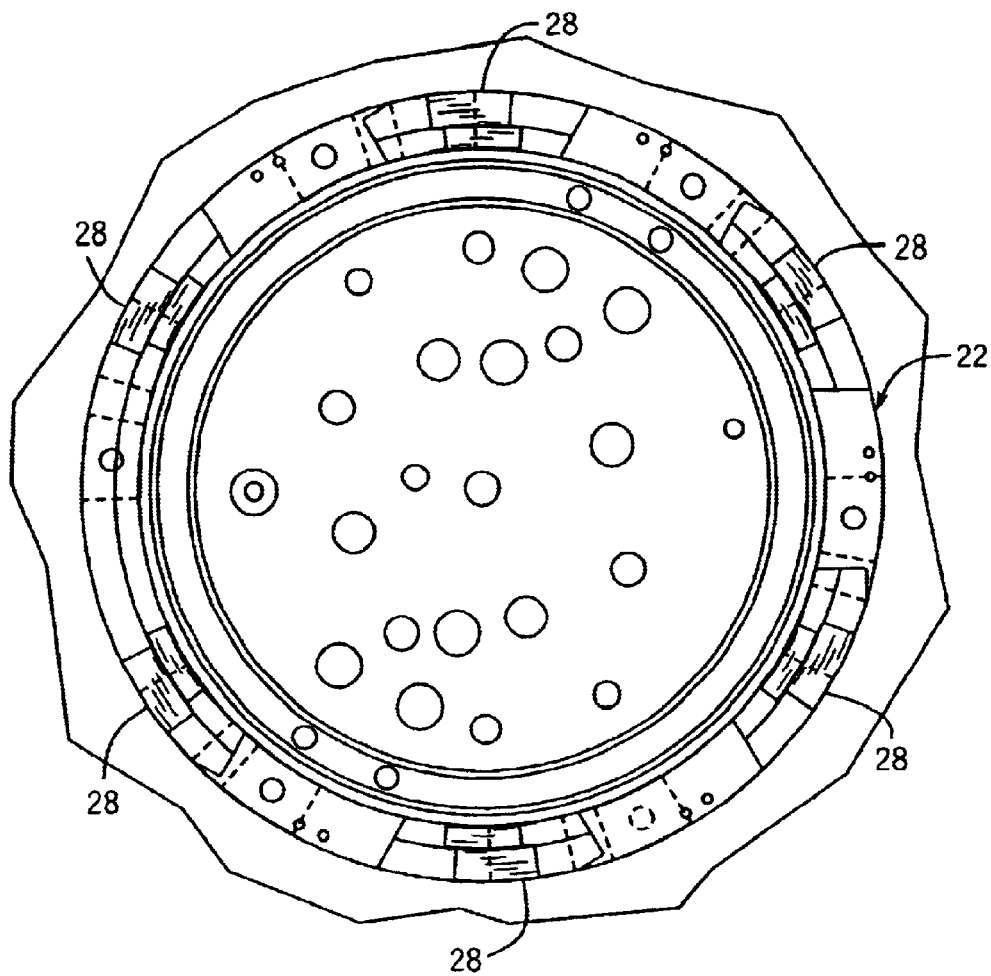
FIG. 4 is a top view of the mold apparatus of FIG. 1 taken along line 4—4 of FIG. 1.

FIG. 4 shows a top view of lower mold plate assembly 22 which comprises part of lower mold plate assembly 22 as shown along line 4—4 of FIG. 1. A number of undercut release components 28 are shown arranged along a mold surface circumference 48. As shown, undercut release components 28 are configured so that configured ends 30 provide a continuous molding surface along mold surface circumference 48 and also a form and undercut. Undercut release components 28 are shown in the engaged or closed position.

Figure 5:
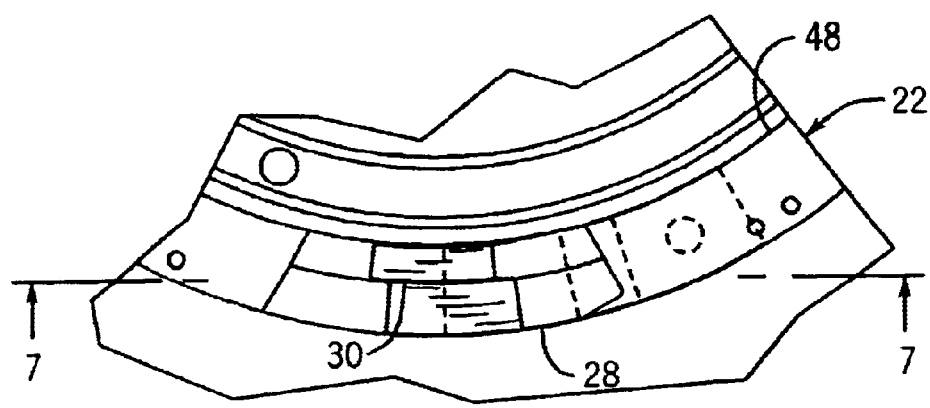
FIG. 5 is a top view of a section of the mold apparatus of FIG. 4 showing the undercut release components in an engaged position.
Figure 6:
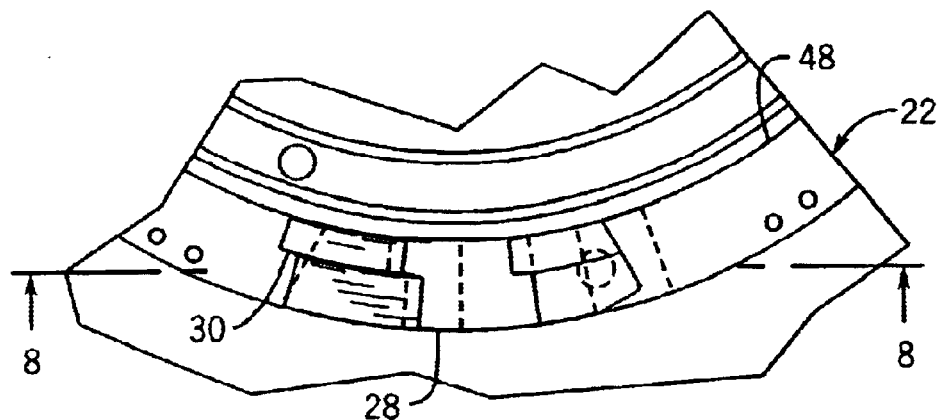
FIG. 6 is a top view of a section of the mold apparatus of FIG. 4 showing the undercut release components in an open position.

FIGS. 5 and 6 show sectional views of lower mold plate assembly 22. FIG. 5 shows the sectional view with undercut release component 28 in the closed or engaged position such that configured end 30 is continuous with mold surface circumference 48. FIG. 6 shows undercut release component 28 in the open or ejection position. In FIG. 6, configured end 30 has advanced above the surface of lower mold plate assembly 22 along a path that moves upward towards the viewer forward to the viewer's left and nonlinearly along the circumference of mold surface circumference 48. The position change of configured end 30 between FIG. 5 and FIG. 6 illustrates the nonlinear aspect of the 3-axis movement of the present invention. The forward and upward movement of configured end 30 is further illustrated in FIGS. 7–9.

Figure 7:
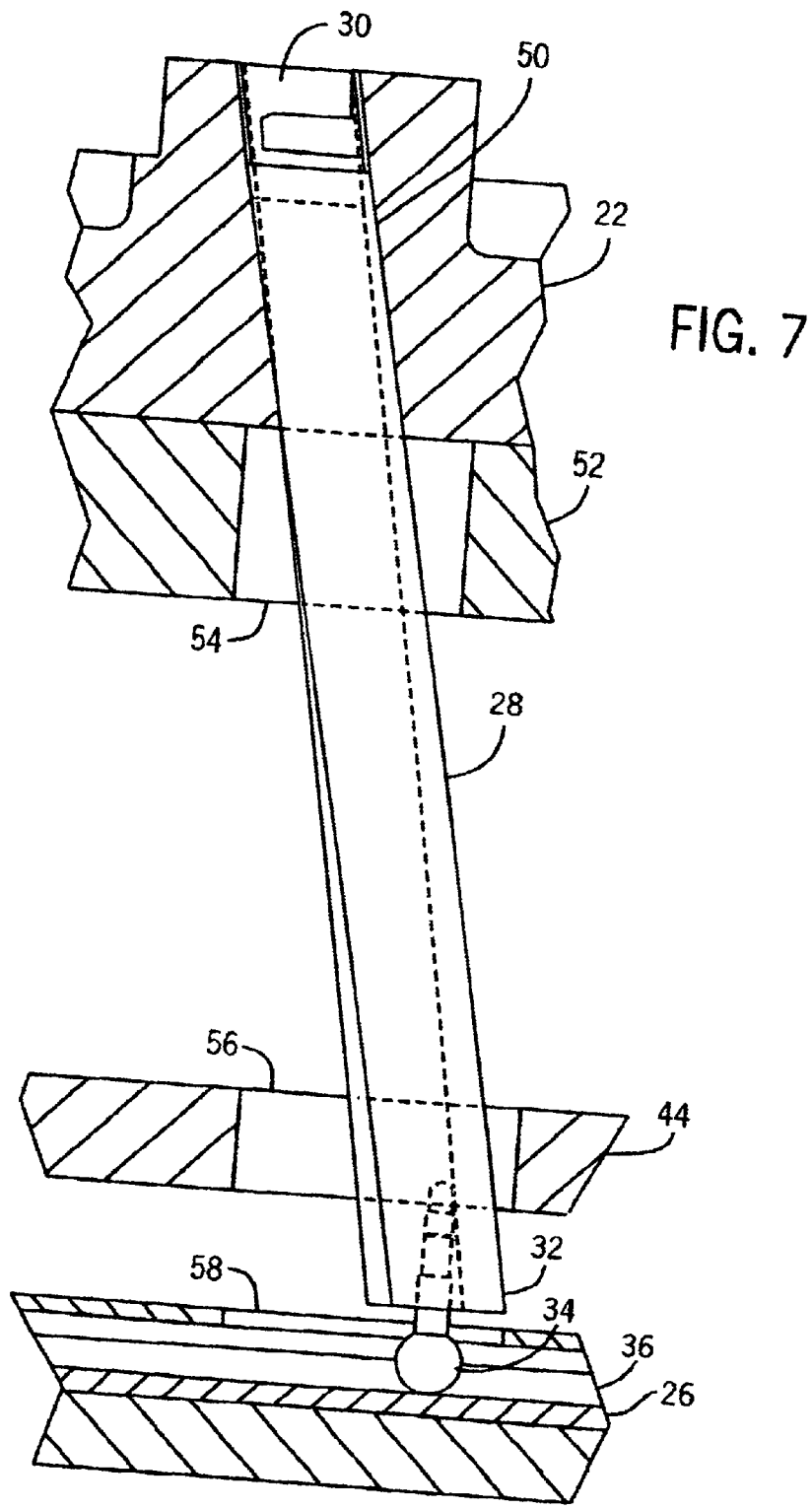
FIG. 7 is a cross-sectional view of the mold apparatus taken along line 7—7 of FIG. 5.

FIG. 7 shows a cross-sectional side view taken along line 7–7 of FIG. 5. Undercut release component 28 engages with lower mold plate assembly 22 via mold assembly slot 50. Undercut release component 28 traverses support plate 52 through support plate relief 54. Likewise, undercut release component 28 traverses second ejector plate 44 though second ejector plate relief 56. Coupling pivot ball 34 connected to coupling end 32 resides in coupling channel 36 of first ejector plate 26. Coupling pivot ball 34 extends through coupling channel slot 58. Both coupling channel 36 and coupling channel slot 58 are nonlinear, typically arcuate. In the closed or engaged position shown in FIG. 7, pivot ball 34 is positioned towards the viewer's right along coupling channel slot 58.

Figure 8:
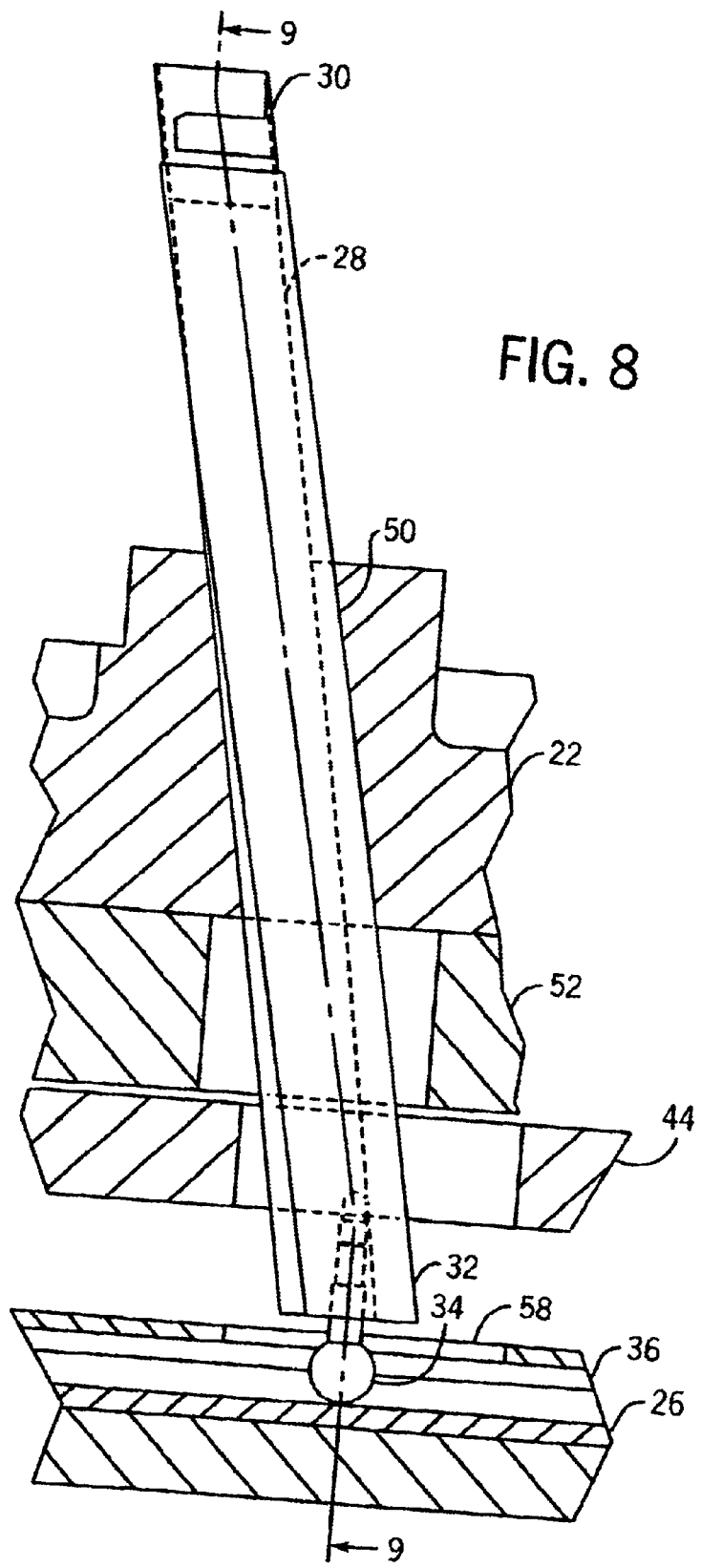
FIG. 8 is a cross-sectional view of the mold apparatus taken along line 8—8 of FIG. 6.

FIG. 8 shows the cross-sectional view taken along line 8—8 of FIG. 6. In this view, the undercut release component 28 is in the open or ejected position. Undercut release component 28 has advanced through mold assembly slot 50 thereby moving configured end 30 upwards above lower mold plate assembly 22 and forward to the viewer's left in relation to mold assembly slot 50. Likewise, coupling pivot ball 34 has advanced forward to the viewer's left along coupling channel 36 and coupling channel slot 58.

Figure 9:
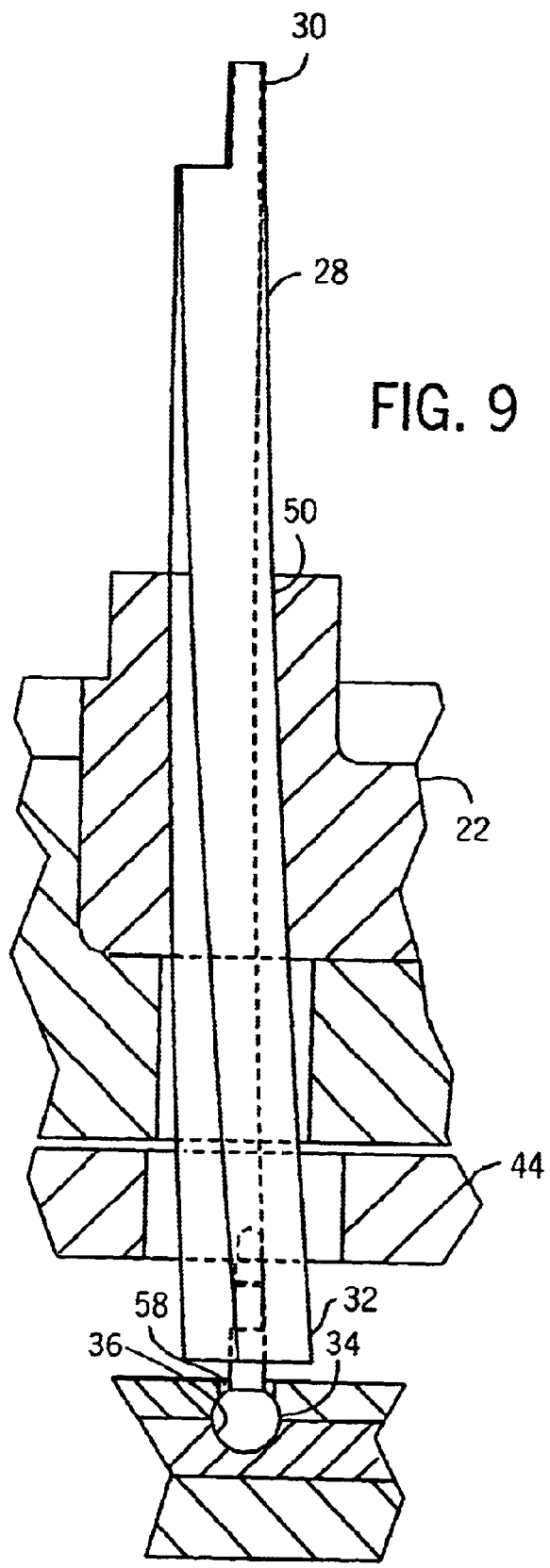
FIG. 9 is a cross-sectional view of the mold apparatus taken along line 9—9 of FIG. 8.

FIG. 9 shows a cross-sectional view along line 9—9 of FIG. 8. FIG. 9 provides another view of the coupling of coupling pivot ball 34 with coupling channel 36 and coupling channel slot 58.

FIGS. 10–12 are front, side and top views of a typical undercut release component 28 of the current invention. The views of FIGS. 10–12 illustrate the twist in the body of undercut release component 28.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for molding parts having at least one undercut, the apparatus comprising:

an undercut release component having a body with a first end configured for molding a part having an undercut;

wherein the undercut release component having a movement whereby the first end moves away from the undercut in a 3 dimensional path.

2. The apparatus of claim 1 wherein the body having a curved shape featuring a twist.

3. The apparatus of claim 2 wherein the twist is helical.

4. The apparatus of claim 2 wherein the undercut release component is slideably engaged with an injection mold assembly.

5. The apparatus of claim 4 wherein the undercut release component slideably engages a slot in the injection mold assembly, the slot configured with a twist complementary to the body.

6. The apparatus of claim 1 wherein the undercut release component further comprises a second end, the second end opposite the first end and adapted for transmitting and receiving both pushing and pulling forces.

7. The apparatus of claim 6 further comprising coupling means for transmitting pushing and pulling forces to the second end and allowing nonlinear movement of the second end.

8. The apparatus of claim 7 wherein the coupling means comprises a pivot ball attached to the second end of the undercut release component engaged within a nonlinear channel, the nonlinear channel located in a means for transmitting pushing and pulling forces.

9. An apparatus for molding parts having at least one undercut, the apparatus comprising:

an undercut release component comprising a body having a first end configured for molding a part having an undercut and an opposite second end adapted for transmitting and receiving both pushing and pulling forces, wherein the undercut release component is slideably engaged with an injection mold assembly; and a coupling engaged with the second end for transmitting pushing and pulling forces to the second end and allowing nonlinear movement of the second end, wherein the undercut release component having a movement whereby the first end moves away from the undercut in a 3 dimensional path.

10. The apparatus of claim 9 wherein the undercut release component further comprises a body extending between the first end and the second end, wherein the body having a curved shape featuring a twist, and the undercut release component slideably engages a slot in the injection mold assembly, the slot configured with a twist complementary to the body.

11. The apparatus of claim 10 wherein the twist is helical.

12. The apparatus of claim 9 wherein the coupling comprises a pivot ball attached to the second end of the undercut release component engaged within a nonlinear channel, the nonlinear channel located in a means for transmitting pushing and pulling forces.

* * * * *